B. FORD.
SECONDARY OR STORAGE BATTERY.
APPLICATION FILED DEC. 12, 1918.
1,367,593.
Patented Feb. 8, 1921.
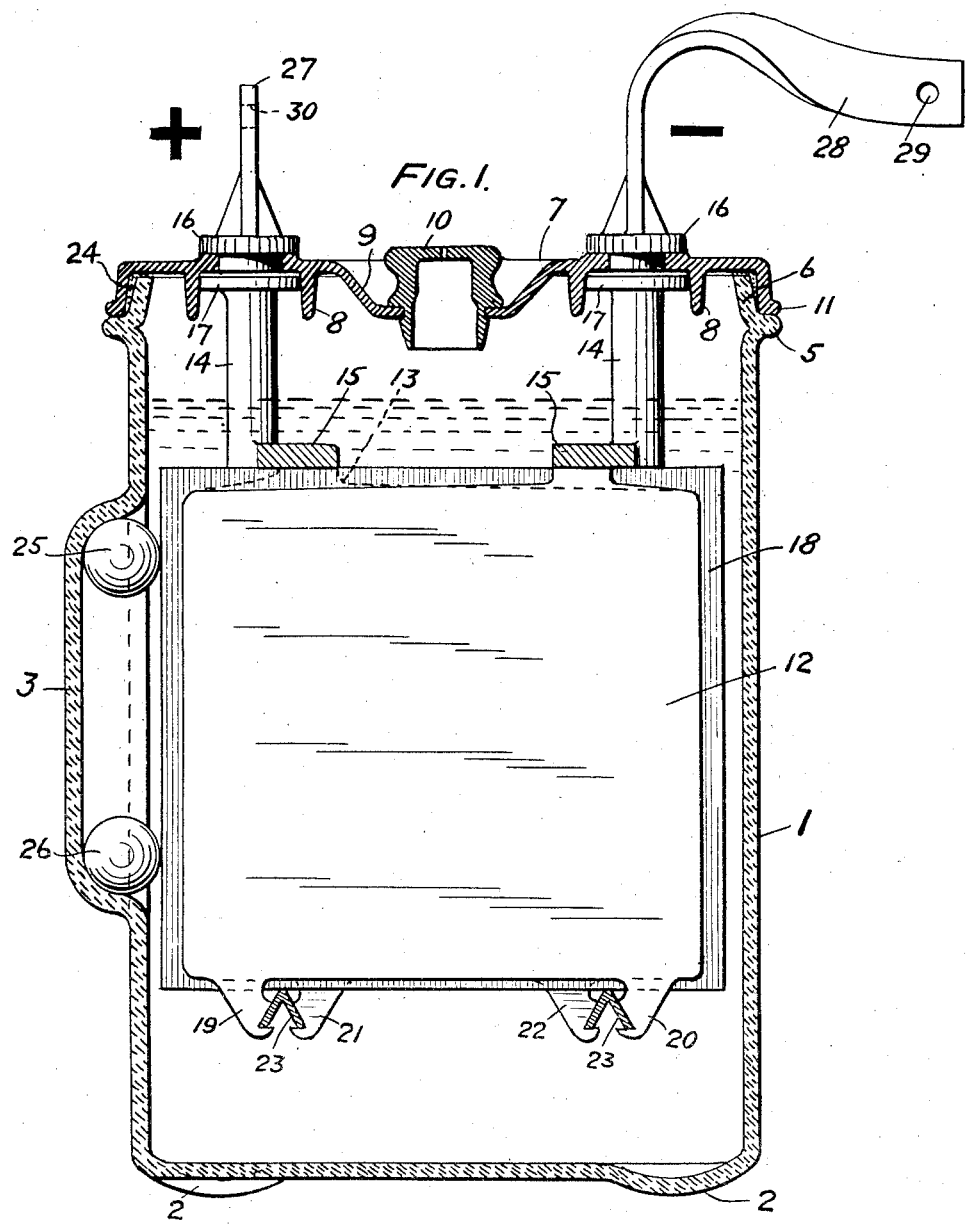
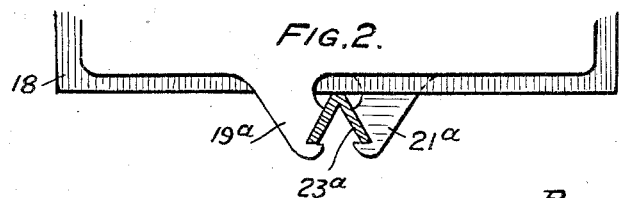
WITNESS:
Rob R Kitchel.
INVENTOR
Bruce Ford
BY
Augustus B. Stoughton,
ATTORNEY.

UNITED STATES PATENT OFFICE.

BRUCE FORD, OF PHILADELPHIA, PENNSYLVANIA.

SECONDARY OR STORAGE BATTERY.

1,367,593.   Specification of Letters Patent.   Patented Feb. 8, 1921.

Original application filed April 14, 1916, Serial No. 91,025. Divided and this application filed December 12, 1918. Serial No. 266,400.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

This application is a division of my application Serially Numbered 91,025, filed April 14th, 1916.

The principal objects of the present invention are to improve secondary or storage batteries in regard to structure and operation in such a way that they are structurally capable of withstanding incidents of usage while comparatively inexpensive and easy to manufacture.

The invention will be claimed at the end hereof, but will be first described in connection with the accompanying drawings forming part hereof and in which—

Figure 1, is an elevational view, principally in section, of a battery embodying features of the invention, and Fig. 2, is a detached view, partly in section, illustrating a modification.

The jar 1, as of glass, is provided on its bottom with three depressions 2, arranged at the points of an imaginary triangle and constituting a three-point support, so that the jar will remain steady when placed upon an uneven support. The jar is also provided with a lateral bulge 3, constituting a sight gage. Around the outside of the jar and near its open end is a bead or flange 5 and above the bead the outside surface of the jar is slightly beveled or contracted as at 6. When the jar is blown, which is the usual way to make a glass jar the contracted surface at 6 above the bead 5 is true because it is made so by being blown against the mold. The cover 7 may consist of hard rubber or other suitable material and may be reinforced as by depending ribs 8, shown as arranged in parallel pairs. At the center of the cover plate there is a depression 9, with a hole at the bottom, which receives the filling and vent plug 10, the depression acting as a funnel. The edge of the cover is turned or offset, forming a flange 11. From the cover the plates 12 and 13 depend, by means of posts 14 and bus-bars 15. The posts 14 are secured to the cover by nuts 16 and collars or enlargements 17 arranged on opposite sides of the covers, and the enlargements 17 may be fitted between the ribs 8. The plates are suspended in this way clear of the bottom and walls of the cell and the separators 18 are arranged between the plates and are preferably larger than the plates to prevent connection across their edges. The bottom edge of each plate is provided with hook-like projections 19 and 20, and 21 and 22. On one set of plates, in the present instance, the negative plates, the projections 19 and 20 are comparatively near the vertical edges. On the other set of plates, in the present instance the positive plates, the projections 21 and 22 are nearer to the center of the plates and are faced in opposition to the projections 19 and 20. 23 are rods of insulating material as hard rubber engaged by the various projections and extending crosswise of the plates. These rods are shown as of generally V-shape and as of hollow section which imparts lightness, and they are fitted to the hook-like projections. The rods serve to support the separators and also to mutually support and interlock the plates in such a way that they remain in proper position and may not swing or turn about the unions of the posts 14 with the cover as a center. Where each plate is provided with two projections, as shown in Fig. 1, the plates are held against swinging even if the battery be inverted.

As shown in Fig. 2, each plate is provided with but one projection 19ᵃ or 21ᵃ and in this case the plates are only mutually held in position by the rod 23ᵃ when the battery is in upright position. So far as the projections are concerned they are the same on each plate, but of course the plates of unlike polarity are oppositely turned.

Between the parts 6 and 7 of the jar and cover and extending over the top edge of the jar there is a sealing compound 24 which is prevented from accidentally working out by the joint formed between the flange 5 and bead 11, so that when the cover is put on with its offset flange 5 outside of the top of the jar there is no danger of squeezing out the sealing compound although the cover supports the weight of the plates. Movably arranged in the bulge 3 is a float indicator, as balls 25 and 26, of appropriate specific gravity to respond in buoyancy to changes of density of the electrolyte. These balls while freely movable are retained in the bulge by the edges of the electrode structure and are of course, freely exposed to the path of circulation of the electrolyte and therefore susceptible to changes in its density. Where a number of cells are connected up together and subjected to similar treatment it is not necessary to provide each cell with a bulge and with balls. The terminal 27 of one of the posts 14 may be rigid while the terminal 28 of the post 14 of unlike polarity is of flexible material and comparatively long. In this way any confusion in connecting up a number of cells is avoided and the cells may be connected by means of a single bolt or the like passed through the apertures 29 and 30 in the terminals and this is a simple, expeditious and safe method of connecting up the cells.

When the cell is fully charged the specific gravity of the electrolyte is great so that both balls rise to the top of the bulge. This position of the balls indicates that the battery is fully charged. As soon as current is taken from the battery the specific gravity of the electrolyte is not so great so that one of the balls drops and indicates that the battery is not fully charged. When the battery is so far discharged that it is advisable to recharge it the specific gravity of the electrolyte is not so great, and both balls fall thus indicating that it is desirable to recharge the battery. It has been said that the plate structure does no turn or swing, and this permits of its use for guiding the balls 25 and 26, and also permits of the use of the depressions 2, when desirable.

It will be obvious to those skilled in the art to which the invention relates that modifications may be made in details of construction and arrangement without departing from the spirit of the invention, which latter is not limited other than as required by the appended claims and the prior state of the art.

What I claim is:

1. In a storage battery the combination of a jar, a cover, plates of one polarity suspended from the cover from one side and plates of the other polarity suspended from the cover from the opposite side and all said plates being narrower than the jar and provided with opposed depending hook-like feet, and a rod engaged by said feet and causing the plates to mutually support each other against edge-wise movement, substantially as described.

2. In a storage battery the combination of a jar, plates of one polarity suspended from one side thereof and plates of the other polarity suspended from the opposite side thereof and all said plates being narrower than the jar and provided with opposed depending feet, and a rod engaged by said feet and causing the plates to mutually support each other against edgewise movement, substantially as described.

BRUCE FORD.